Dec. 20, 1966   J. L. HUTSON   3,293,523
FIVE LAYER DIODE COUNTER E.M.F. SPEED CONTROL SYSTEM
Filed Aug. 5, 1963   2 Sheets-Sheet 1
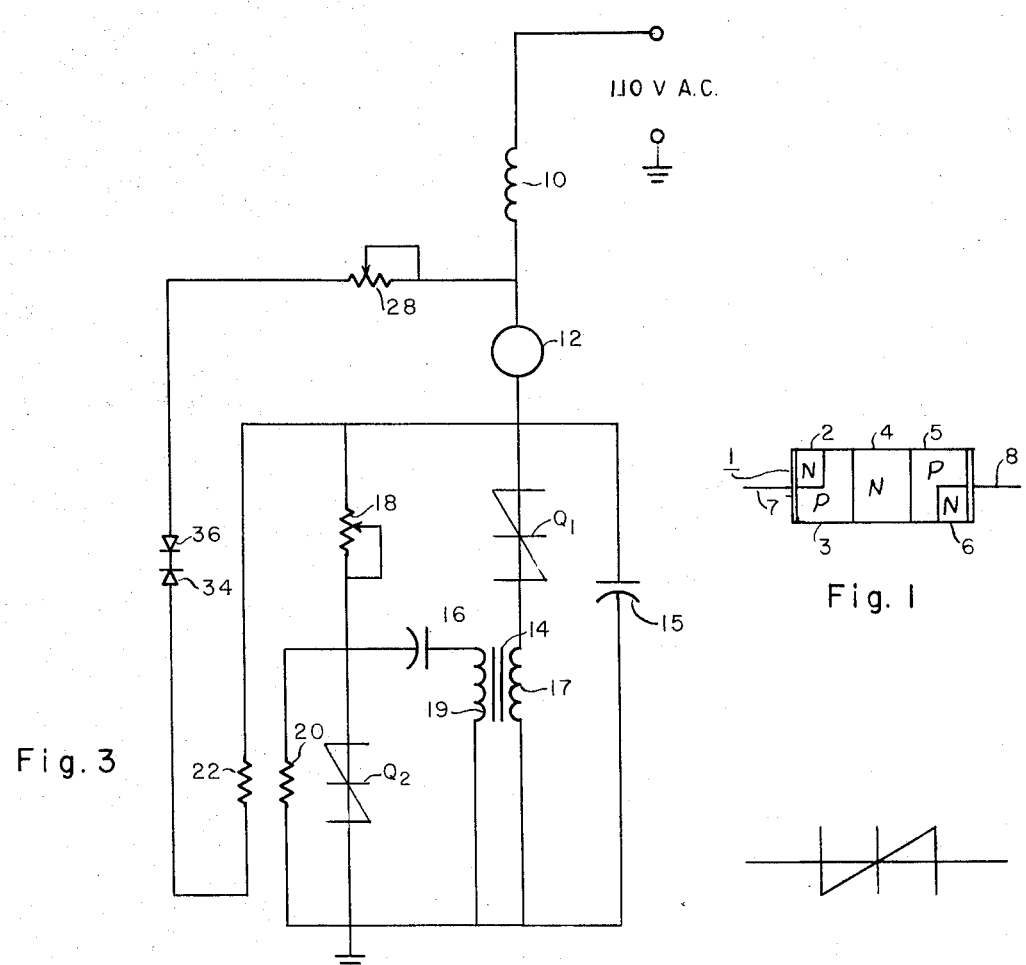
Fig. 1
Fig. 2
Fig. 3
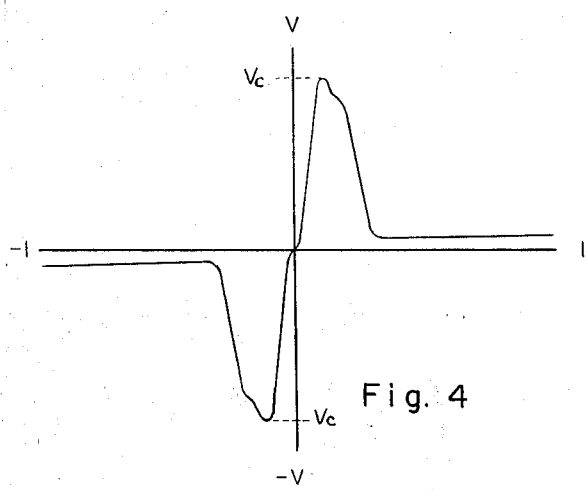
Fig. 4
INVENTOR.
Jearld L. Hutson
BY INVENTOR.
Jearld L. Hutson
BY

United States Patent Office 3,293,523
Patented Dec. 20, 1966

3,293,523
FIVE LAYER DIODE COUNTER E.M.F. SPEED CONTROL SYSTEM
Jearld L. Hutson, Richardson, Tex., assignor to Hunt Electronics Company, Dallas, Tex., a corporation of Texas
Filed Aug. 5, 1963, Ser. No. 299,704
17 Claims. (Cl. 318—331)

The present invention relates to motor control systems and more particularly to an electronic motor control which functions by controlling the effective current flowing through the motor as a function of the effective armature voltage.

In many motor control applications, it is desirable that the motor control have the capability of either maintaining the motor speed constant over a relatively wide range of loads or varying the speed of the motor over a desired range of speeds. The present invention provides an electronic motor control which is capable of satisfying both needs, and which utilizes a circuit that is relatively uncomplicated and inexpensive, but yet extremely reliable in operation.

In United States Letters Patent No. 3,188,487, assigned to the assignee of this application, there is disclosed a system for controlling the power applied to a load from a source of alternating current supply voltage. In accordance with one embodiment of the invention disclosed in Patent No. 3,188,487, energy is stored in a capacitor or other energy storage element until the potential across a voltage sensitive switch is sufficient to cause the switch to close. When the voltage sensitive switch closes, it connects the energy storage element in series with the input winding of a transformer. The energy storage element discharges through the input winding of the transformer, producing a voltage pulse at the output winding of the transformer. The output winding of the transformer is connected either in series or shunt with a second voltage sensitive switch. The second voltage sensitive switch is connected in series with a source of alternating current supply voltage and a load. The voltage pulse produced at the output of the transformer responsive to the closure of the first voltage sensitive switch is effective to cause the second voltage sensitive switch to close for the remainder of a half cycle of alternating current supply voltage. The current is thereby permitted to flow through the winding of the motor for a desired portion of each half cycle, the effective value of the current flowing being a function of the conduction time of the second voltage sensitive switch.

The preferred form of voltage sensitive switch for practicing the invention is a semiconductor device characterized by a normally high impedance state but having a low impedance state following the presence of a trigger voltage. The trigger voltage may be characterized by an amplitude in excess of the breakdown voltage of the device or a rate of rise sufficiently fast to charge the junction capacitance of the device at a rate which will cause the device to switch to its low impedance state.

In accordance with the principles of the present invention, the potential developed across the armature winding of a motor is applied to vary either or both of the rate of storage of energy in the energy storage means and the saturation current of the first voltage sensitive switch as a function of the effective voltage produced across the armature winding and thereby control the time at which the first switch closes in accordance with the effective armature voltage.

According to one embodiment of the invention, the potential produced across the armature winding is applied to a heating element. The heating element is arranged in good thermal contact with a heat sensitive impedance which affects the rate at which energy is stored in the energy storage means and thereby controls the time required for the potential across the voltage sensitive switch to attain an amplitude sufficient to cause the switch to close.

A second embodiment of the invention utilizes a semiconductor device fabricated from a material whose energy gap is such that the saturation current which flows prior to switching varies over a relatively wide range as the temperature of the device is caused to vary. A heating element, whose temperature is dependent on the effective armature voltage, is positioned in good thermal contact with the device, causing the temperature of the device to vary as a function of the effective armature voltage. The change in saturation current of the device as its temperature varies is effective to provide the desired control over the conduction time of a second voltage sensitive switch.

Many objects and advantages of the invention will become apparent to those skilled in the art as the following detailed description of the same unfolds when taken in conjunction with the appended drawings wherein like reference numerals denote like parts and in which:

FIGURE 1 is a diagrammatic illustration of a preferred type of semiconductor device for use as the voltage sensitive switch;

FIGURE 2 is the electrical symbol for the device shown in FIGURE 1;

FIGURE 3 is a schematic diagram illustrating one preferred embodiment of the present invention;

FIGURE 4 is a curve illustrating the current-voltage chracteristics of a device such as that shown in FIGURE 1 and which is suitable for use in practicing the present invention;

Figure 6:
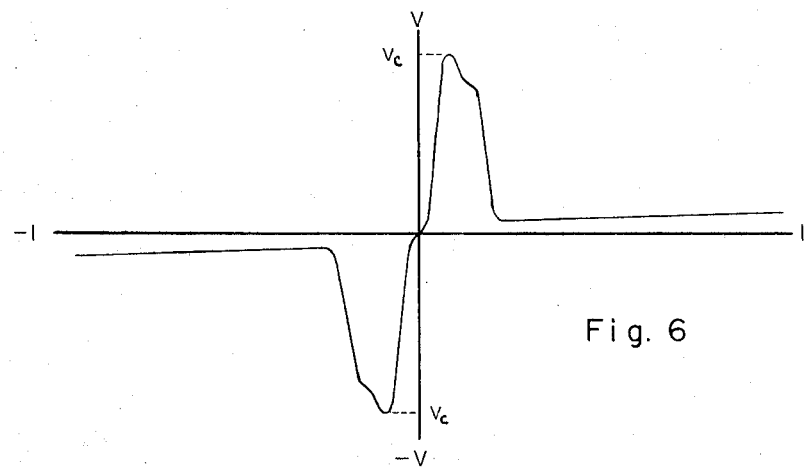
FIGURES 6 and 7 are curves illustrating the manner in which the current-voltage characteristics of a certain type of device useful in practicing the second embodiment of the invention vary as the temperature of the device varies.

The preferred form of a voltage sensitive switch for practicing the invention is a semiconductor device of the type disclosed in my co-pending patent application Ser. No. 197,308, filed May 24, 1962, now abandoned, and assigned to the assignee of the present invention. Such a device is designated by the reference numeral 1 in FIGURE 1 of the drawings. As shown, the device 1 is formed of a body of semiconductor material having five discreet regions or layers 2–6 formed therein. Contiguous layers are of opposite type conductivity and regions 2 and 6 are of restricted cross section. The lead 7 contacts both the N-type region 2 and the P-type layer 3 and the lead 8 contacts both the N-type region 6 and the P-type layer 5. The electrical symbol for this device is shown in FIGURE 2.

Turning now to FIGURE 3 of the drawings, the series winding and armature winding of a single phase, series motor are denoted by the reference numerals 10 and 12 respectively. As shown, one terminal of the field winding 10 is connected to a source of alternating current supply voltage, suitably 110 volts. The other side of the field winding 10 is connected through armature winding 12 to a semiconductor device $Q_1$ of the type shown in FIGURE 1. The avalanche breakdown voltage of the device $Q_1$ is greater than the maximum applied alternating current supply voltage. The other side of the device $Q_1$ is connected through the output winding of a transformer 14 to ground. Capacitor 15, which may include the interelectrode capacitance of the circuit, is connected across the device $Q_1$ and the output winding 17 of transformer 14.

The input winding 19 of the transformer 14 is connected through a capacitor 16 to one side of a second semiconductor device $Q_2$. The device $Q_2$ is also suitably of the type shown in FIGURE 1 of the drawings. The other side of the device $Q_2$ is also connected to ground. A resistor 18 is connected between the juncture of the armature winding 12 and the device $Q_1$ and the junction point between the capacitor 16 and the device $Q_2$. A resistor 20 connected in parallel with device $Q_2$ is also provided. Resistor 20 is suitably one having a negative temperature coefficient. That is, the resistance of resistor 20 decreases as the temperature to which it is subjected increases.

It is seen that substantially the entire applied line voltage will appear across the voltage divider network comprising the resistors 18 and 20 and that the capicitor 16 will be charged at a rate dependent upon the applied voltage and the resistance of resistors 18 and 20. At such time as the potential to which the capacitor is charged becomes greater than the avalanche breakdown voltage of the device $Q_2$, the device $Q_2$ will switch to its low impedance state, providing a discharge path for the capacitor 16 through the device $Q_2$ and the input winding of the transformer 14.

The above can perhaps be best understood with reference to FIGURE 4 of the drawings which illustrates the current-voltage characteristics of the device shown in FIGURE 1 of the drawings. Thus, if the peak voltage applied to the device 1 is less than the critical breakdown voltage $V_c$, the device will exhibit a very high impedance and only a very low leakage current will flow. If a voltage equal to or greater than the voltage $V_c$ is applied across the device, the device will switch to a low impedance state and will thereafter conduct large currents with only a small voltage drop across the device. Once the device switches to the low impedance state, it will remain in such a state so long as the voltage across the device is sufficient to produce the necessary holding current. It is seen that the device shown in FIGURE 1 is symmetrical. That is, it can be switched to the low impedance state by proper potential of either polarity.

Turning again to FIGURE 3 of the drawings, it can be seen that since the device $Q_2$ provides a very low resistance discharge path for the capacitor 16 after it switches to the low impedance state, the discharge of the capacitor 16 will occur very quickly, producing a steep, high voltage pulse at the output of the transformer 14. The transformer 14 is wound to present a very low impedance to the supply voltage frequency, but a high impedance to a fast rising pulse such as is produced by discharge of the capacitor 16 through device $Q_2$. It is practical for the field winding 10 to serve as the output winding of transformer 36 or as an auto transformer having an input tap connected to capacitor 16.

The output pulse produced at the output of the transformer 14 in conjunction with the applied line voltage is much greater than the avalanche breakdown voltage of the device $Q_1$, causing the device $Q_1$ to switch to its low impedance state for the remainder of the half cycle of applied alternating current supply voltage. The capacitor 15 tends to maintain the voltage across the device $Q_1$ and winding 17 substantially constant as the triggering voltage is applied, facilitating consistent and reliable operation. Reference may be had to Patent No. 3,188,487 for a better description of the function of capacitor 15 and the operation of the switching circuitry if such be necessary.

The conduction time of the device $Q_1$ during any particular half cycle controls the effective current flowing through the motor windings and thereby controls the speed of the motor. By varying the resistance of the resistor 18 or the resistor 20, the time required for the capacitor 16 to charge to the critical voltage of the device $Q_2$ is caused to vary with time, thereby controlling the conduction time of the device $Q_1$ and the effective current flowing through the motor windings 10 and 12. Varying the resistance of the resistor 18 or the resistor 20 is thereby effective to control the speed of the motor.

A heating element 22 is located in close physical proximity to the resistor 20 such that the heat produced in the element 22 is rapidly transferred to the resistor 20. It is preferable that the resistor 20 and the element 22 be mounted on a suitable plate or encapsulated in a suitable substance characterized by high thermal conductivity but a very low thermal mass in order that changes in the amount of thermal heat generated by the element 22 may positively affect the resistance of the resistor 20 without an appreciable time delay.

One side of the element 22 is connected to the juncture between the armature winding 12 and the device $Q_1$. The other side of the element 22 is connected through zener diodes 24 and 26 and a variable resistor 28 to the juncture between the field winding 10 and the armature winding 12. It is thus seen that the potential impressed across the element 22 will be a function of the armature voltage and, therefore, a function of the speed of the motor to be controlled.

The amount of current flowing through the element 22 is suitably controlled by variable resistor 28. Thus, in operation of the circuit shown in FIGURE 3, the resistance of the element 22 is such that with the variable resistor 28 adjusted for minimum resistance, maximum heat will be produced when the motor is operating at its maximum speed, and the resistance of the resistor 20 will be at a minimum. The size of the resistors 18 and 20 is such that the motor will operate at a predetermined minimum speed at no load conditions and with the resistor 28 adjusted for maximum heating. It is preferred that this minimum speed be sufficiently high to produce a potential across the armature winding equal to or slightly in excess of the reverse breakdown voltage of the diodes 24 and 26.

At speeds below a preselected minimum speed, the potential across the armature winding 12 will be less than the breakover voltage of either of the diodes 24 and 26 and no current will flow through the element 22. At speeds in excess of this predetermined minimum value, the potential developed across the armature winding 12 will be greater than the reverse breakdown voltage of the diodes 24 and 26 and current will flow through the element 22, producing heat. The amount of heat produced will be a function of the effective voltage across the armature winding.

To increase the speed of the motor, the resistance of the resistor 28 can be increased, causing less current to flow through the element 22. The amount of heat produced by the element 22 will therefore decrease, producing an increase in the resistance of the resistor 20. The increase in resistance of the resistor 20 will cause the capacitor 16 to charge to a potential equal to the breakover voltage of the device $Q_2$ earlier in the half cycle of applied alternating current voltage, thereby increasing the effective current flowing through the windings of the motor and increasing the speed of the motor.

As a load is applied to the motor, the potential across the armature winding will decrease, causing a lesser amount of current to flow through the element 22 and decreasing the amount of heat produced. The decrease in the amount of heat produced by the element 22 will, as described above, cause the device $Q_1$ to be in its low impedance state for a greater portion of a half cycle, increasing the effective current flow through the windings of the motor and thereby increasing the power produced by the motor as needed to maintain the speed constant. If, on the other hand, the load should decrease, the potential across the armature winding will increase, causing a greater amount of heat to be produced by the element 22. The effective current flowing through the motor will decrease as the conduction time of the device $Q_1$ is lessened, thereby reducing the power produced by the motor and maintaining the speed of the motor constant.

It will be appreciated that similar results can be obtained if the resistor 20 is eliminated and the resistance of the resistor 18 is varied due to the heating produced by element 22. However, if such an arrangement is used, the resistor 18 must have a positive temperature coefficient and the temperature characteristics of elements having a negative temperature coefficient are especially desirable.

Thus, in accordance with the embodiment of the invention shown in FIGURE 3, the rate at which energy is stored in an energy storage element is made to vary as a function of the effective voltage produced across the armature winding of the motor. At such time as the energy storage means is charged to a predetermined level, a voltage sensitive switch is closed, permitting the energy storage device to discharge through the input winding of the transformer, producing a pulse at its output winding. The pulse produced at the output winding of the transformer is effective to cause a second voltage sensitive switch to switch to the low impedance state, permitting current to flow through the windings of the motor for the remainder of the half cycle.

A motor control circuit is thereby provided which utilizes a diode capable of switching from a normally high impedance state to a low impedance state responsive to the presence of a triggering voltage of predetermined character and returning to the high impedance state when the current through the device is reduced below a predetermined value. The diode is connected in series with the armature winding of the motor to be controlled for controlling the effective current flowing through the armature winding. The triggering voltage is produced responsive to the presence of a control signal and coupled to the diode to cause it to break down at a desired point in the half cycle. Means are provided for producing the control signal and varying the time relationship between the beginning of the half cycle of alternating current supply voltage and the control signal as a function of the effective voltage across the armature winding to thereby control the effective current flowing through the armature winding as a function of the speed of the motor.

Figure 5:
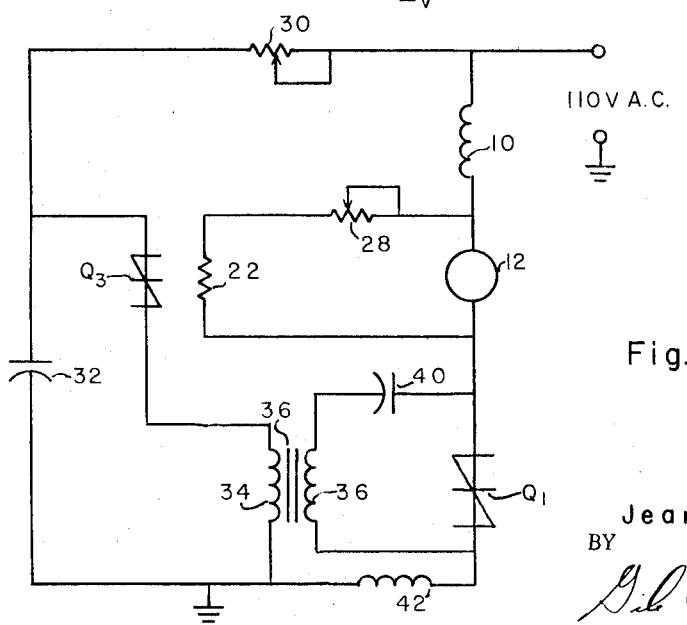
FIGURE 5 is a schematic diagram illustrating a second embodiment of the invention.

Turning now to FIGURE 5 of the drawings, a second embodiment of the invention wherein the switching characteristics of a device $Q_3$ are varied responsive to change in effective voltage of the armature winding is shown. In accordance with the second embodiment of the invention, the field coil 10 and armature winding 12 of the motor are connected in series with the device $Q_1$ across a source of alternating current supply voltage. A resistor 30 and a capacitor 32 are also connected in series across the source of alternating current supply voltage. A symmetrical semiconductor device $Q_3$ is connected from the juncture between resistor 30 and capacitor 32 to one side of the primary winding 34 of transformer 36, the other side of the winding 34 being connected to ground. The secondary winding 38 of transformer 36 and a capacitor 40 are connected across the device $Q_1$.

The circuitry described until now with reference to FIGURE 5 is similar to an embodiment of the invention described in Patent No. 3,188,487, which operates in what is referred to as the shunt mode. As described in Patent No. 3,188,487, during each half cycle of the applied alternating current supply voltage, the capacitor 32 will be charged through the charge path provided by the resistor 30. At such time as the capacitor 32 is charged to a voltage equal to or in excess of the breakover voltage of the device $Q_3$, the device $Q_3$ will switch to its low impedance state, allowing the capacitor 32 to discharge through the primary winding 34 of transformer 36. The capacitor 32 and device $Q_3$ thus form a portion of a control pulse forming network.

The transformer 36 is similar to the transformer 14 of FIGURE 3 in that it presents a high impedance to fast rising pulses such as is produced by the control pulse forming circuitry. It produces a triggering voltage which is applied through the capacitor 40 across the device $Q_1$, the triggering voltage being either in excess of the forward breakover voltage of the device $Q_1$ or having a rate of rise greater than that which the device $Q_1$ would stand without passing to the low impedance state. The capacitor 40 presents a low impedance to fast rising pulses, but a very high impedance to the alternating current supply voltage, preventing substantial loss of power. The armature winding 12 and field winding 10 of the motor provide an inductive reactance between the device $Q_1$ and the source of alternating current supply voltage which has a very high impedance to the triggering voltage and insures that virtually the entire triggering voltage will be applied across the device $Q_1$. However, dependent upon the distributed capacitance of the motor windings, it may be necessary to provide an inductor 42 in series with the device $Q_1$ to maintain the voltage across the device $Q_1$ as it switches to the low impedance state.

Following the application of the triggering voltage, the device $Q_1$ will conduct to virtually the end of the half cycle. The effective current flowing through the windings of the motor and therefore the speed and power of the motor are controlled by controlling the time interval which elapses from the beginning of a half cycle of alternating current supply voltage until the device $Q_1$ is caused to switch to its low impedance state. The speed of the motor may be controlled by adjusting the variable adjustor 30 and thereby control the time required for the capacitor 32 to be charged to a level sufficiently high to cause the device $Q_3$ to switch to its low impedance state.

A variable resistor 28 and a heating element 22 are also connected across the armature winding of the motor in a manner similar to that described with reference to FIGURE 3 of the drawings. Diodes 24 and 26 may be included if desired. The heating element 22 is ranged in good thermal contact with the device $Q_3$ such that the temperature of the device $Q_3$ will quickly reflect changes in heat produced by the element 22. The device $Q_3$ utilized in practicing this second embodiment of the invention is preferably of germanium or similar material having a low energy gap and whose switching characteristics vary as the temperature of the device is changed as shown in FIGURES 6 and 7 of the drawings.

Figure 7:
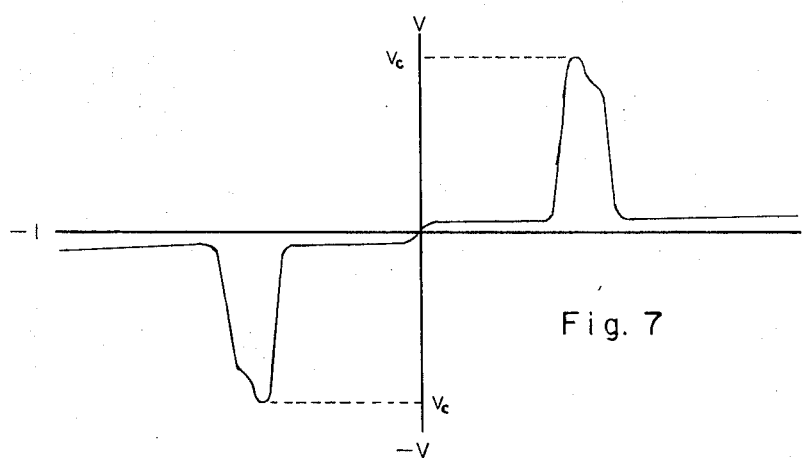

Referring now to FIGURE 6 of the drawings, at room temperature, the switching characteristics of the device $Q_3$ will be quite similar to the switching characteristics of the device $Q_1$ shown in FIGURE 4 of the drawings. However, as the temperature of the device is increased, the saturation current which flows in the device prior to the time that switching occurs will increase considerably, as shown in FIGURE 7, increasing the time required for the device $Q_3$ to switch to the low impedance state and decreasing the conduction time of the device $Q_1$. As the temperature of the device $Q_3$ is dependent upon the amount of heat produced by the element 22 which is in turn dependent upon the armature voltage, the switching characteristic of the device $Q_3$ is made to vary as a function of the armature voltage. The no lead speed of the motor can be controlled as desired by varying the resistor 30 which controls the rate at which the capacitor 32 is charged or by varying the resistor 28 which controls the amount of heat produced by the element 22 for a particular armature voltage.

In operation of the circuitry, if the load on the motor should increase, the speed of the motor will decrease, decreasing the voltage across the armature and resulting in a decrease in the amount of heat produced by the element 22. As the temperature of the device $Q_3$ decreases, less saturation current will flow and the device $Q_3$ will switch to its low impedance state, producing the desired control pulse at an earlier time in the half cycle. The device $Q_1$ will, therefore, switch to its low impedance state sooner in the half cycle of alternating current supply voltage, increasing the effective current flowing through the motor with a corresponding increase in power applied to the motor.

As the power of the motor increases, the speed of the motor will increase to the desired constant speed. If at any time it is desired to increase the speed of the motor, the resistance of resistor 30 may be decreased, causing the capacitor 32 to charge to the desired level sooner in the half cycle to produce the desired increase in power applied to the motor. Alternatively, the resistance of the variable resistor 28 can be increased, lessening the amount of heat produced by the element 22 and causing the switching of the device $Q_3$ to occur sooner, also producing an increase in the effective power applied to the motor with an attendant increase in speed.

From the above, it is seen that this second embodiment of the invention utilizes a shunt mode of firing in which it is not necessary that the current flowing through the motor also flow through the transformer 36, permitting the current carrying capacity of the secondary winding 38 to be decreased considerably. In accordance with this second embodiment of the invention, the switching characteristics of the device included in the control pulse forming network is varied as a function of the armature voltage to control the conduction time of the device $Q_1$ and thereby obtain the desired constant speed. The speed of the motor can be set at any desired level, either by varying the impedance in the charge path of the energy storage element or by varying the impedance in the heater circuit.

A symmetrical zener diode $Q_4$ (shown in phantom) may be used as a heat source rather than a more conventional heating element 22. If such a device $Q_4$ is used, as the armature voltage exceeds the zener breakdown voltage of the device $Q_4$, current will flow causing the temperature of device $Q_4$ to rise. Such a device $Q_4$ will usually generate more heat per unit mass than conventional heating elements and reduce the number of elements required for those applications wherein it is desirable to incorporate zener diodes in the heating circuit.

Although the invention has been described with reference only to two preferred embodiments, many changes and modifications will be obvious to those skilled in the art. Thus, for example, either the shunt or series mode of operation could be utilized when the desired control is obtained either by varying the impedance in the charge path of the energy storage element or by varying the switching characteristics of the device $Q_3$ as a function of the effective voltage across the armature winding. If desired, a phase shifting network of the type disclosed in my co-pending application Serial No. 184,841, filed April 3, 1962, can be utilized in the control pulse forming circuitry. Accordingly, the invention is not to be limited to what is described herein but only as necessitated by the scope of the appended claims.

What I claim is:
1. A motor control that comprises:
    (A) A symmetrical five layer semiconductor device capable of switching from a normally high impedance state to a low impedance state responsive to the presence of a triggering voltage of predetermined character and returning to the high impedance state when the current through said device is reduced below a predetermined value;
    (B) Means for connecting the armature winding of a motor to be controlled in series with said diode means;
    (C) Means for producing said triggering voltage responsive to the presence of a control signal and coupling said triggering voltage to said diode means;
    (D) Means for producing said control signal; and
    (E) Means to vary the time relationship between the beginning of a half cycle of alternating current supply voltage and said control signal as a function of the effective voltage across said armature winding.

2. A motor control that comprises:
    (A) First diode means capable of being excited from a normally high impedance state to a low impedance state;
    (B) Means for connecting said first diode means in series with a source of alternating current supply voltage and the armature winding of a motor to be controlled;
    (C) A transformer having an input and an output;
    (D) Second diode means capable of being switched from a normally high impedance state to a low impedance state;
    (E) Circuit means for providing a charge path for storing energy in said energy storage element;
    (F) Means including said second diode means for providing a discharge path for said energy storage element through the input of said transformer;
    (G) Said second diode means being effective to switch to the low impedance state responsive to the amount of energy stored in said second element attaining a predetermined level;
    (H) Means connecting the output winding of said transformer to produce a triggering voltage across said first diode means of a character to switch same to the low impedance state responsive to the discharge of said energy storage element through the input winding when said second diode means switches to the low impedance state; and
    (I) Means for varying at least one of the rate of storage of energy in said energy storage means and the switching characteristics of said second diode means as a function of the effective voltage produced across said armature winding to control the time interval from the beginning of a half cycle of applied alternating current supply voltage until said second diode means switches to the low impedance state.

3. A motor control as defined in claim 2 wherein said means for varying at least one of the rate of storage of energy in said energy storage means and the switching characteristics of said second diode means as a function of the effective voltage produced across the armature winding comprises a heating element connected across said armature winding and in good thermal contact with one of a resistive element affecting the rate of charge of said energy storage means and said second diode means.

4. A motor control as defined in claim 2 wherein said means for varying the rate of storage of energy in said energy storage element comprises means for varying the temperature of one of a resistor connected in series with said energy storage element and a resistor connected in parallel with said energy storage element as a function of the effective armature voltage.

5. A motor control as defined in claim 2 wherein said second diode means is of a semiconductor material having a low energy gap and wherein the saturation current of said device prior to switching varies as a function of the temperature of the device, said means for varying the switching characteristics of said second diode means comprising means for varying the temperature of said second diode device as a function of the effective armature voltage.

6. A motor control as defined in claim 3 wherein said heating element is a resistive heater.

7. A motor control as defined in claim 6 further including two oppositely poled zener diodes connected in series with said heating element across said armature winding, the zener voltage of said zener diodes being substantially equal to the voltage produced across said armature winding under no load conditions with the motor operating at the minimum desired speed.

8. A motor control as defined in claim 7 further including means for varying the resistance of one of the series circuit containing said heater element and the charging circuit of said energy storage element to thereby vary the speed of the motor.

9. A motor control as defined in claim 3 wherein the output of said transformer is connected in series with said first diode means and further including capacitive reactance means connected in parallel with said output of said transformer and said first diode means for maintaining the voltage across said first diode means and said output of said transformer substantially constant as said diode means is switched to the low impedance state.

10. A motor control as defined in claim 9 wherein the output of said transformer is the field winding of the motor to be controlled.

11. A motor control as defined in claim 3 wherein said heating element is a symmetrical zener device.

12. A motor control as defined in claim 3 wherein the output of said transformer and a capacitor are connected in series across said first diode means.

13. A motor control as defined in claim 12 further including an inductive reactance connected in series with said first diode means.

14. A motor control as defined in claim 3 wherein said first diode means and said second diode means are semiconductor devices having at least three rectifying junctions formed therein.

15. A motor control as defined in claim 14 wherein said second diode means is of a semiconductor material having a low energy band gap.

16. A motor control as defined in claim 15 wherein said semiconductor material is germanium.

17. A motor control circuit that comprises:
  (a) a semiconductor device having at least three rectifying junctions formed therein and of a semiconductor material having a low energy ban gap, said semiconductor device being switched from a normally high impedance state to a low impedance state responsive to the presence of a triggering voltage of a predetermined character and returning to the high impedance state when the current through the device is reduced below a predetermined value;
  (b) means for connecting the armature winding of a motor to be controlled in series with said semiconductor device;
  (c) means for producing said triggering voltage responsive to the presence of a control signal and coupling said triggering voltage to said semiconductor device;
  (d) means including an energy storage element and a switching device effective responsive to the energy stored in said energy storage element attaining a predetermined level for producing said control signal; and
  (e) means to vary the switching characteristics of said switching device as a function of the effective voltage across said armature winding to thereby control the time relationship between the beginning of a half cycle of alternating current supply voltage and said control signal as a function of the effective voltage across said armature winding.

References Cited by the Examiner

UNITED STATES PATENTS 2,981,880 4/1961 Momberg et al. ___ 318—331 X
3,176,209 3/1965 Cappello _____ 318—331 X
3,191,112 6/1965 Cain _____ 318—331 X ORIS L. RADER, *Primary Examiner.*

S. GORDON, J. C. BERENZWEIG, *Assistant Examiners.*